United States Patent
Wu et al.

(10) Patent No.: US 8,949,370 B1
(45) Date of Patent: Feb. 3, 2015

(54) MOBILE APPLICATION GENERATION

(75) Inventors: Ping Wu, Saratoga, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/005,244

(22) Filed: Jan. 12, 2011

(51) Int. Cl.
*G06F 15/16* (2006.01)

(52) U.S. Cl.
USPC .......................................... 709/217; 709/203

(58) Field of Classification Search
CPC ............ H04L 29/1215; H04L 41/5041; H04L 43/045
USPC ................... 709/217, 203; 715/863; 707/705; 705/14.4
See application file for complete search history.

(56) References Cited

U.S. PATENT DOCUMENTS

| | | | |
|---|---|---|---|
| 6,993,575 B2 * | 1/2006 | Abkowitz et al. | 709/220 |
| 7,302,463 B1 * | 11/2007 | Shao et al. | 709/203 |
| 7,681,127 B2 * | 3/2010 | Thurston | 715/265 |
| 7,774,721 B2 * | 8/2010 | Milic-Frayling et al. | 715/855 |
| 8,091,071 B2 | 1/2012 | Tsantilis | |
| 2005/0114470 A1 * | 5/2005 | Bal | 709/219 |
| 2006/0031387 A1 * | 2/2006 | Hamzeh et al. | 709/217 |
| 2007/0255799 A1 * | 11/2007 | Forbes | 709/217 |
| 2008/0168405 A1 * | 7/2008 | Tolmasky et al. | 715/863 |
| 2009/0129575 A1 * | 5/2009 | Chakraborty et al. | 379/201.03 |
| 2009/0228838 A1 * | 9/2009 | Ryan et al. | 715/853 |
| 2010/0281475 A1 | 11/2010 | Jain et al. | |
| 2011/0113090 A1 * | 5/2011 | Peeri | 709/203 |
| 2011/0271194 A1 * | 11/2011 | Lin et al. | 715/728 |
| 2012/0117181 A1 | 5/2012 | Patel et al. | |

\* cited by examiner

*Primary Examiner* — Un C Cho
*Assistant Examiner* — Romani Ohri
(74) *Attorney, Agent, or Firm* — Fish & Richardson P.C.

(57) ABSTRACT

This specification describes technologies relating to content presentation. In general, one aspect of the subject matter described in this specification can be embodied in methods that include the actions of receiving a request to generate a mobile application associated with a collection of web resources; presenting a template to a user, the template being configured to receive user input specifying features of the mobile application to be generated and identifying corresponding resources of the collection of web resources; and processing, using one or more processors, the received template data to automatically generate the mobile application for the collection of web resources and including the user specified features. Other embodiments of this aspect include corresponding systems, apparatus, and computer program products.

28 Claims, 5 Drawing Sheets

MOBILE APPLICATION GENERATION

BACKGROUND

The present disclosure relates to content presentation.

Many mobile devices allow users to navigate network content (e.g., web content) using a browser application on the mobile device. For example, users can navigate to and download content associated with particular web pages. Additionally, many mobile devices also allow mobile applications to be downloaded and executed on the mobile device. A mobile application is an application specifically designed for operation on a mobile device (e.g., a smartphone). In some instances, a mobile application can be created to provide content from a particular web site. Some mobile applications can also include advertisements positioned within the content of the mobile applications.

SUMMARY

This specification describes technologies relating to content presentation.

In general, one aspect of the subject matter described in this specification can be embodied in methods that include the actions of receiving a request to generate a mobile application associated with a collection of web resources; presenting a template to a user, the template being configured to receive user input specifying features of the mobile application to be generated and identifying corresponding resources of the collection of web resources; and processing, using one or more processors, the received template data to automatically generate the mobile application for the collection of web resources and including the user specified features. Other embodiments of this aspect include corresponding systems, apparatus, and computer program products.

These and other embodiments can optionally include one or more of the following features. The method further includes presenting a preview of the generated mobile application to the user. The method further includes receiving one or more editing inputs from the user; and modifying the generated mobile application according to the received one or more editing inputs. Processing the received template data includes generating XML data from the template. Automatically generating the mobile application includes applying the XML data to a code skeleton for a mobile application of a particular type. Automatically generating the mobile application includes retrieving content from the identified resources. Presenting the template includes determining a category for the mobile application and selecting a template from a plurality of templates based on the determined category.

The method further includes receiving user input specifying features of the mobile application including identifying content categories for presentation in the mobile application. The method further includes receiving user input specifying features of the mobile application including specifying layout features for the mobile application to be generated. The method further includes receiving user input specifying one or more of a device, service provider, or operating system platform for the mobile application to be generated.

In general, one aspect of the subject matter described in this specification can be embodied in methods that include the actions of receiving request for content from a mobile application executing on a mobile device, the request including an identification of a resource location associated with the content; identifying, using one or more processors, the content associated with the resource location; retrieving the requested content; and sending the requested content to the mobile application. Other embodiments of this aspect include corresponding systems, apparatus, and computer program products.

These and other embodiments can optionally include one or more of the following features. Retrieving the requested content includes identifying cached content previously retrieved from the identified resource location. Retrieving the requested content includes retrieving the requested content from the identified resource location.

Particular embodiments of the subject matter described in this specification can be implemented to realize one or more of the following advantages. Mobile application versions of existing websites can be readily and quickly generated. Web content publishers can quickly and easily design customized, automatically generated, mobile applications having features specified by the web content publishers. Content can be quickly and readily loaded to mobile devices and provided to users of mobile devices. Web content publishers can receive advertising revenue in association with automatically generated mobile applications.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Mobile applications can be automatically generated based on associated web resources. A template for a mobile application can be presented to a user (e.g., a website administrator). The website administrator can specify one or more websites or webpages having content to be included in the mobile application. The website administrator can further specify a layout and design parameters for a mobile application using the template. The information provided by the website administrator can be used to automatically generate a mobile application based on web content of the one or more websites or webpages specified by the website administrator.

In some implementations, the website administrator can specify one or more mobile devices (including different devices, platforms, or service providers of the mobile devices) for which mobile applications are to be created. Mobile applications that are specific to each of the specified one or more mobile devices can be automatically generated using the layout and design parameters specified by the website administrator.

Figure 1:
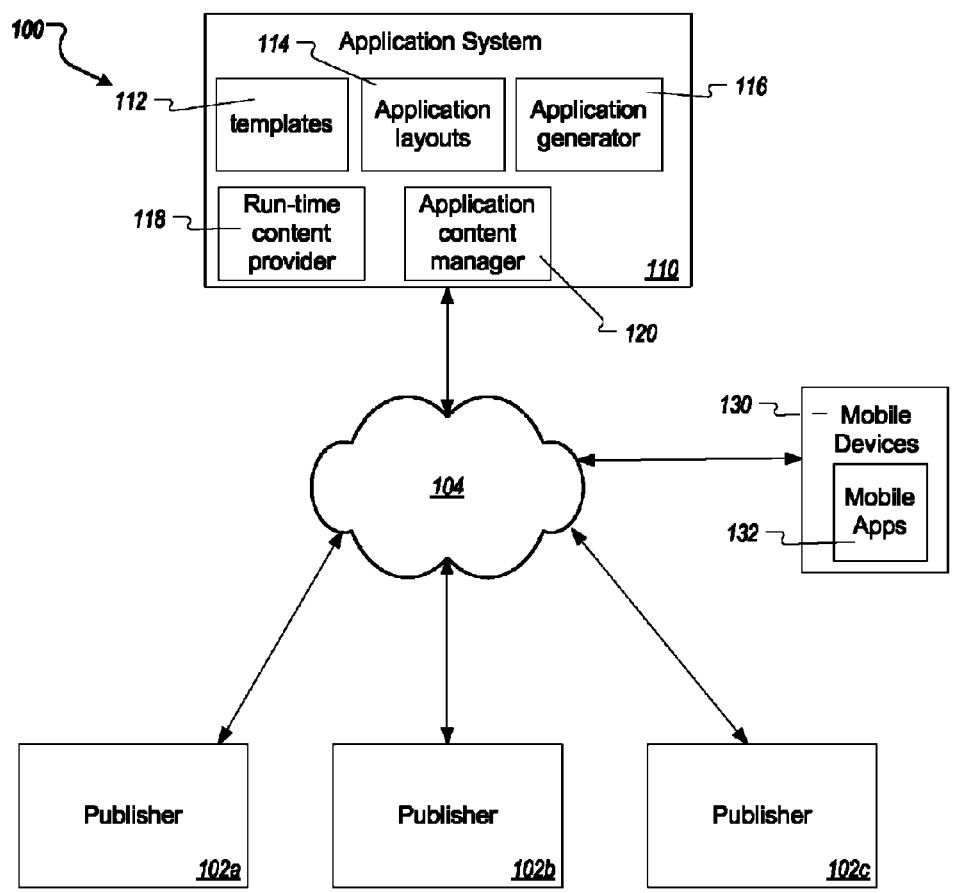
FIG. 1 is a diagram of an example system for automatically generating mobile applications.

FIG. 1 is a block diagram of an example system 100 for automatically generating mobile applications. The system 100 includes publishers 102a-c in communication with an application system 110 through a network 104 (e.g., Internet, LAN, WAN, etc.). The publishers 102a-c can be, for example, general content providers that receive requests for content (e.g., articles, discussion threads, music, video, graphics, search results, web page listings, information feeds, etc.), and retrieve the requested content in response to the request.

For example, the publisher 102a can be a publisher of a website. The publisher 102a can receive requests for web content and provide webpages of the website in response to the requests. In some implementations, the publishers 102a-c combine the requested content with one or more of the ads provided by an ad system. The ads can be in the form of graphical ads, such as banner ads, text only ads, image ads, barcode ads (e.g., ads including one or more barcodes that can be used in redeeming the ad), audio ads, video ads, animated ads, ads combining one or more of any of such components, etc. The ads can also include embedded information, such as links, meta-information, and/or machine executable instructions.

The combined content and ads can be sent to user devices that requested the content for presentation in a viewer (e.g., a browser or other content display system). Alternatively, in some implementations, the publisher provides the requested content to the user devices separate from one or more ads provided by an ad system. For example the ad system can send the ads directly to the user devices for integrating with the received publisher content (e.g., before rendering the content or as received).

As another example, the publishers 102a-c can include a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a specified number of (e.g., ten) search results. In some implementations, the search service combines search results with one or more of the ads provided by an ad system. The combined search results and ads can be sent to user devices that requested the content for presentation in a viewer (e.g., a browser or other content display system).

The application system 110 can include one or more servers having one or more processors for executing executable code and performing functions as described below. The application system can include memory for storing executable code, and input/output functionality for communicating with other systems over the network 104.

The application system 110 can automatically, in response to a request, generate mobile applications for the publishers 102a-c. For example, the publisher 102a can contact the application system in order to create a mobile application for a website associated with the publisher 102a. The application system 110 can generate a mobile application 132 using information provided by the publisher 102a. The generated mobile application 132 can be provided to one or more mobile devices 130 (e.g., a user can install the mobile application on their mobile device). When a user of one of the mobile devices 130 causes the generated mobile application 132 to execute, the generated mobile application 132 can present content extracted or downloaded from the website of the publisher 102a to the user. The mobile devices 130 can include, for example, cellular phones, personal digital assistants (PDAs), tablet devices, personal gaming devices, net books, or other mobile computing devices.

The application system 110 can include a collection of templates 112. The templates 112 can be mobile application templates that allow the publishers 102a-c to provide parameters and/or other information for a mobile application. In some implementations, the application system 110 allows the publishers 102a-c to indicate a website or web resource type for which a mobile application is to be generated (e.g., a news site or an audio site). The application system 110 then uses this information to identify one or more templates 112 that are suited for the specified type of website or web resource.

For example, a first template can be presented by the application system 110 for websites that are mostly text, or text and image based that include a series of postings (e.g., news websites, gossip websites, blogs, event postings). A second template can be presented by the application system 110 for websites that include streaming video presentation (e.g., TV network websites, user produced video content websites). A third template can be presented by the application system 110 for websites that include streaming audio presentation (e.g., internet radio stations), and a fourth template can be presented by the application system 110 for websites that include mapping functionality. Templates for various other types of website or web resources can also be presented by the application system 110. Other types of templates can include templates for social websites, in particular, those having dynamic content, templates for photo album websites, templates for ratings/reviews websites, templates for particular application categories (e.g., entertainment mobile applications, utilities mobile applications, etc).

The different types of templates in a collection of templates 112 can include different features and/or mobile application structures that are suited to the different types of websites for which mobile applications are to be created. For example, a template for websites that include mapping functionality can include a region for displaying a map and scrolling functionality to allow a user to scroll through the map. As another example, a template for a website made up of news articles can include an area for displaying news article headlines. In some cases, the template can include areas for displaying a thumbnail image and an article summary or snippet in association with each headline. As another example, a template for a streaming video website can include an area for presenting videos, areas for indicating featured videos, and an area to allow users to search for video content.

In some implementations, more than one of the templates in the collection of templates 112 is associated with a type of website or web resource. In such implementations, the application system 110 can present multiple templates to one of the publishers 102a-c that are associated with a type of website or web resource for which a mobile application is to be created. The publisher can then select one of the presented templates to use for creating the mobile application.

In some implementations, the application system 110 does not receive information from the publishers 102a-c as to what type of website or web resource for which a mobile application is to be created. In some such implementations, the application system 110 can present a number of templates to publishers 102a-c and allow the publishers 102a-c to select templates to use in the creation of mobile applications. For example, the application system 110 can provide a user interface to the publisher 102b that allows a user to select a template from among multiple templates. A user associated with the publisher 102b can use the interface to select a template.

The application system 110 can then provide the selected template to the publisher 102b and the user can use the presented template to enter information that can be used to create a mobile application. In some alternative implementations, the application system 110 provides a default template when there is not enough information to identify a particular template. Alternatively, the application system 110 can automatically select the template (e.g., a default template or based on analysis of a website provided by the publisher).

In some implementations, the collection of templates 112 includes a single template. The single template can be provided to the publishers 102a-c in response to requests for the creation of mobile applications. The single template can be adapted to create mobile applications for various different types of websites or web resources.

A given publisher of the publishers 102a-c can use templates presented by the application system 110 to indicate specifications or parameters for a mobile application that is to be generated for websites and web resources associated with the particular publisher. For example, the publisher 102c can send a request to the application system 110 to create a mobile application for an event listings website. The application system 110 can identify a template for event listings websites and provide (e.g., present in a user interface) the identified template to the publisher 102c.

A user associated with the publisher 102c can use the template to specify parameters for the mobile application according to the template. Information that can be entered into the template by the user can include layout, design, color scheme, logos, images, header text, and categories. For example, the user can upload a logo for the website and enter a title for the website. The logo and title can be used to create a header for the mobile application. Additionally, the logo can be used to create an icon for a mobile application selection screen of a mobile device.

As another example, the user can specify a number (e.g., five) of listing previews to provide on a main page of the mobile application, and a size for each listing preview (e.g., number of lines, height, or width of each listing). The listing previews can be presented in an area within the mobile application that provides information derived from full event listings. The user can specify what information to include in each listing preview. For example, the user can indicate that a title, a thumbnail image, and a two line snippet is included for each listing preview. The user can indicate a position for the thumbnail image and text within each listing preview and indicate fonts and font sizes for the text. In some implementations, the user indicates if the snippet for each listing preview should be a summary of the full listing associated with the listing preview, the first few lines of the full listing, or another portion of the full listing. In some other implementations, the user indicates that each listing preview is to include a date, time, and location for the event associated with the listing preview.

In some implementations, the user can specify criteria used to determine which event listings are displayed in the listing previews on the main page of the mobile application. For example, the user can indicate that events listed/categorized as featured events on the website are to be displayed as listing previews on the main page of the mobile application. As another example, the user can indicate that the most recently posted events are to be displayed as listing previews on the main page of the mobile application. As yet another example, the user can indicate that the soonest upcoming events are to be displayed as listing previews on the main page of the mobile application.

In some implementations, the user specifies a color scheme or design pattern for the mobile application. For example, the template can include a library of design patterns for borders of the mobile application. The user can select one of the design patterns from the design pattern library. As another example, the user can upload a design to be used for the borders or background of the mobile application.

In some implementations, the user indicates categories to be included in a category menu for the mobile application. Continuing the above example of a template for an event listings website, the user can indicate categories of dining events, nightlife events, family friendly events, theatre events, and athletic events to be included in a category menu. The user can further indicate URLs for webpages of the event listing website that correspond to each category. For example, the user can enter a URL of a theatre event listings webpage in association with the theatre events category. Additionally, in some implementations, the user designates in the template particular permanent icons for the mobile application, e.g., icons at the bottom of the user interface for the mobile application that remain fixed regardless of the particular content currently being displayed in the mobile application interface. For example, the icons can relate to navigation controls or core categories.

In some implementations, the template is designed to minimize user input necessary to automatically generate a mobile application for a specified website. For example, the template can include only a small number of customizable features. In some implementations, additional modifications to the layout or other parameters are allowed when the mobile application generated from the template is previewed for the user.

In some implementations, the application system 110 automatically identifies categories to be included in the category menu for the mobile application. For example, the application system 110 or an associated system can parse the event listings website to identify categories of event listings (e.g., based on structural information in the identified website, for example, document tags). The application system 110 can identify the event listings as falling into categories of bar related events, music related events, outdoor activities, professional athletic events, and recreational sporting events. As another example, the application system 110 or an associated system can parse cached web data associated with the event listings website to identify categories.

In some implementations, the application system 110 presents the suggested categories to the user (e.g., using the template). The user can elect to keep some or all of the suggested categories. In some implementations, the user enters category titles in place of or in addition to the categories suggested by the application system 110. In some implementations, the template includes a list of suggested categories that are popular categories for similar mobile applications. For example, for a mobile application associated with a gossip website, the template can include a drop down menu of popular category titles for other gossip websites and allow the user to select from among the category titles.

In some implementations, the template allows the user to enter other information or create additional selectable controls for the mobile application. For example, the user can indicate that the mobile application is to include a selectable control that causes the associated website to be loaded in a web browser of a device running the mobile application. As another example, the user can indicate that the mobile application is to include login fields to allow a user of the mobile application to enter a user name and password to log into a personal account.

As yet another example, the user can indicate that the mobile application is to include a search field to allow users to search content associated with the mobile application (e.g., content derived from the website associated with the mobile application). As yet another example, the template can allow the user to include a scrolling text field in the mobile application. The scrolling text field can continually display newly entered events, featured events, or upcoming events.

In some implementations, the application system 110 streamlines the process of receiving parameters for the mobile application including allowing the user to indicate whether or not execution and content loading speed is a priority. For example, the template can include options for the user to indicate if content loading speed is a very high priority, moderately high priority, or low priority. In this example, if the user indicates that content loading speed is a very high priority, the template can restrict the features that can be included in the mobile application in order to increase content loading speed of the mobile application. For example, the template can restrict the number of thumbnail images included in the mobile application in order to increase content loading speed of the mobile application.

In some implementations, the template allows the user to designate one or more areas of the mobile application as advertising areas of the mobile application. The user can further indicate a number of advertisements to include in the advertising areas. Including advertisements in the mobile application can allow the publisher 102c to collect advertising royalties in association with the mobile application.

In some implementations, the user is allowed to indicate positions for various elements within a display of the mobile application. For example, the user can indicate that the header is to be positioned at the top, with a first advertising area positioned under the header, listing previews positioned under the first advertising area, a second advertising area positioned under the listing previews, and category selection controls positioned at the bottom of the display of them mobile application. In some implementations, the template provides the user with a default layout for the items to be presented within the display of the mobile application. In some implementations, the user is allowed to accept the default layout, suggest a different layout, or edit the default layout. In some implementations, the user is only allowed to choose from limited number of predefined layouts for the mobile application.

A publisher can submit some or all of the above described information, as well as additional information to be used in the creation of a mobile application, to the application system 110 according to the template provided by the application system 110. For example, a template can be provided to the publisher 102b as part of a user interface. A user associated with the publisher 102b can enter parameters for a mobile application using the user interface and select a submit control button to submit the entered information.

In some implementations, the application system 110 automatically categorizes content and generates a corresponding structure for a mobile application without additional information from the publisher. For example, upon receiving a URL or other identifying information, the application system 110 can analyze the content and generate a mobile application using a default template or based on the content. For example, content analysis can include identifying keywords corresponding to particular categories and applying an appropriate template for that category.

In some implementations, the application system 110 uses the information submitted by the publisher to create a preview (e.g., mock up) of a mobile application and present the preview to a user associated with the publisher. The preview can be presented to the user as part of a user interface. The application system 110 can allow the user to use the user interface to adjust the layout or other parameters of the mobile application.

Upon receiving the information submitted by the publisher, the application system 110 can generate and or store a mobile application layout that includes the submitted information in a collection of application layouts 114 (e.g., a database of application layout files). For example, the application system 110 can generate and store the mobile application layout as an XML file in the collection of application layouts 114. The collection of application layouts 114 can include application layouts for mobile applications requested by a plurality of publishers. In some implementations, the application layouts in the collection application layouts 114 are stored in multiple different file formats. In some implementations, the application layouts are stored in a single file format.

In some implementations, the generated layout includes social sharing features. For example, the layout can be used to generate a mobile application that allows a user to log into the mobile application with a social networking identity. The user can then share content from the mobile application with their social network (e.g., a news article or other posting).

In some other implementations, the generated layout includes geolocation features for the generated mobile application. For example, the mobile application layout for a news application can include a category of "near me" so that news articles can be provided that are close to the user's physical location (e.g., based on GPS or other location information available from the mobile device executing the mobile application). Similarly, applications can use geolocation information to provide users with particular postings, deals, or advertisements associated with the user's location.

The application system 110 includes an application generator 116 for generating mobile applications from the collection of application layouts 114, for example, by generating program code and compiling it into an executable program compatible with a mobile device. The application generator 116 can access the collection of application layouts 114 and select a particular application layout.

The application generator 116 can then create executable code (e.g., Objective-C code or Java code) for a mobile application using the selected application layout. In some implementations, a publisher that has requested the creation of a mobile application for a website can indicate one or more mobile devices or platforms for which mobile applications are to be created. The application generator 116 can then use the application layout associated with the website to generate mobile applications for the indicated mobile devices.

For example, the publisher 102a can request the creation of a mobile application associated with a website or collection of websites where each website can include one or more pages. The publisher 102a can indicate that mobile applications for the website are to be created for cell phone brand A (or mobile device platform A), cell phone brand B, and portable video game device brand C. The application generator 116 can access the store of application layouts 114 and identify an application layout for the website. The application generator 116 can then use the identified application layout to create one or more mobile applications as indicated by the particular publisher 102a.

In some implementations, the application generator 116 can access executable code skeletons (e.g., Objective-C or Java code skeletons) that are specific to different user devices, providers, or platforms. For example, a first executable code skeleton can be associated with cell phone brand A while a second executable skeleton is associated with cell phone brand B. The executable code skeletons can include one or more objects that can be included in a customized mobile application. For example, the executable code skeleton can include an object that can cause third party content, e.g., advertisements, to be presented by the mobile application. The object can, for example, be responsible for requesting relevant ad(s), displaying the ad(s) in the right manner to a user of the mobile application, and tracking whether the user clicks on the ad or otherwise interacts with the ad.

In some implementations, the object is a Java object that is configured to be added to a user interface of the application and handle fetching and rendering of, and interaction with, content such as advertisements. For example, the developer can implement a view object that extends a view class associated with the mobile application. In some implementations, an advertising view object could include "GoogleBaseAdView(String client)".

This can represent a base class to create an advertisement view. A constructor can set the client parameter in a content ads request that can include a URL for a frontend involved in content requests. The above object can extend a more general view class, such as a WebView class and can in some implementations be extended by other more specific classes directed at advertising. In some examples, such an extension can use "void setAdLayoutType(int placement)" to specify top and/or bottom placement of the view that requests the content. Other ways of displaying the content (e.g., an advertisement) can be used, e.g., a gallery that places thumbnails of image content in a gallery view.

One or more functions can be used with the object. Such function(s) can customize the look and feel of the content when it is displayed. In some implementations, such function(s) can set one or more CGI parameters in a content request. For example, any or all of the following functions can be used:

void setAdType(String adType)
    void setChannels(String[ ] channels)
    void setBackgroundColor(Color color)
    void setBorderColor(Color color)
    void setTitleColor(Color color)
    void setTextColor(Color color)
    void setUrlColor(Color color)
    void setScreenContent(String content)
    void setFormat(String format)
    void setCity(String city)
    void setCountryString country)
    void setRegion(String region)
    void setLanguage(String languageCode)
    void setIp(String ip)
    void setKeywords(String[ ] keywords)
    void setOutputEncoding(String encoding)
    void setScreenWidth(int width)
    void setScreenHeight(int height)
    void setUserAgent(String userAgent)

The application generator 116 can customize the executable using information received from a publisher to create a mobile application for a particular platform (e.g., a particular brand of mobile device or a particular operating system). For example, the platform can be a platform created or supported by the Open Handset Alliance. The application generator 116 can change values of the executable skeleton or add code segments to the executable skeleton in order to create the mobile application in accordance with mobile application parameters provided by the publisher.

The mobile applications created by the application generator 116 can be provided to one or more of the mobile devices 130. Each mobile device 130 can include memory for storing one or more mobile applications 132. For example, a mobile device can download mobile applications by accessing a mobile application download site using a web browser of the mobile device and store the mobile applications in memory. As another example, some or all of the mobile devices 130 can access designated mobile application stores where users can download or purchase mobile applications. In some implementations, the publishers 102a-c are allowed to specify prices for mobile applications sold to users of the mobile devices 130.

A user of one of the mobile devices 130 can execute a mobile application 132 by selecting a title or icon associated with the mobile application 132 from a list of mobile applications 132. For example, the mobile application 132 can be a mobile application associated with a news website associated with the publisher 102a. The user can cause the mobile device 130 to execute the mobile application 132 by selecting the title "News Site 1" from a list of mobile application titles. Executable code of the mobile application 132 can cause the mobile device 130 to display a user interface for the mobile application to the user.

In some implementations, some of the content displayed by the mobile application 132 is locally stored in the memory of the mobile device 130 while other content displayed by the mobile application 132 is provided by an run-time content provider 118 of the application system 110 through the network 104. For example, upon execution of the mobile application 132, the mobile application 132 can cause the mobile device 130 to send a request for content to the application system 110, e.g., through the network 104. The run-time content provider 118 can receive the request and provide content derived from a website associated with the mobile application 132 to the mobile device 130 for presentation to the user.

Mobile application content that is stored locally on the mobile device 130 can include an application header, one or more logos or other images, one or more category titles, one or more category selection icons, an opening page for the mobile application (e.g., a page presented prior to the main page of the mobile application), navigation icons, login fields, other text entry fields, border designs, and background designs/images for the mobile application 132.

Mobile application content that is received from the run-time content provider 118 can include dynamic content that is derived from one or more websites or web resources associated with the mobile application 132. For example, if the mobile application 132 is associated with a news website, the dynamic content can include headlines and article snippets from news articles posted on the website. The dynamic content can additionally include thumbnail images associated with the news articles. As another example, the dynamic content can include videos that are included as part of a website associated with the mobile application 132.

In some implementations, the user selects a category selection icon to cause different dynamic content to be displayed by the mobile application 132. For example, the user can select a sports category icon to cause news articles related to sports to be displayed by the mobile application 132. In some implementations, when the user selects the sports category icon, the mobile application 132 causes the mobile device 130 to send a request to the run-time content provider 118 for sports related news articles.

The run-time content provider 118 then provides headlines, thumbnails, and article snippets for a number of sports related articles to the mobile device 130 for presentation by the mobile application 132. In some implementations, the user selects a headline or article snippet to cause a full version of the article to be presented by the mobile application 132. As another example, the user can select a video category selection icon to cause descriptions of videos to be displayed. In some instances, the user can select one of the video descriptions to cause the associated video to be played by the mobile application 132. In some implementations, selecting a previewed listing, news article, video clip, etc. causes a page of the associated website to be loaded by a browser of the mobile device 130. In some implementations, the mobile application 132 simply displays the content provided by the run-time content provider 118 according to the structure of the mobile application 132 and user interaction with the mobile application 132.

The application system 110 includes an application content manager 120 for retrieving content from websites or other web resources that can be provided by the run-time content provider 118 to mobile devices executing mobile applications. For example, the application content manager 120 can periodically (e.g., every two hours) access a website, or cached data extracted from a website, in order to retrieve content from the website. For example, the publisher 102*a* uses the application system 110 to create a mobile application for a news website. The application content manager 120 can periodically crawl the news website to identify new news articles that have been posted on the website. The application content manager 120 can then store the obtained news articles and format the obtained news articles for presentation by the mobile application.

In some implementations, URL's corresponding to that particular portions of the website are associated with particular portions of the mobile application (e.g., categories of content). For example, a news website can have categories such as "sports" or "entertainment" as separate pages or frames in a website. The user can identify the corresponding URL in the template to facilitate retrieval of news articles in that category. The application content manager 120 can then retrieve content for those particular categories (e.g., when the particular category is requested by the user of the mobile application).

In some implementations, formatting the obtained news articles includes generating previews of the news articles that include headlines, thumbnail images, and snippets of the news articles. In some implementations, formatting the obtained news articles includes parsing the obtained data to strip away or otherwise separate advertisements and other content not directly related to the main content of a news article. For example, the application content manager 120 can obtain a webpage that includes a news article. The application content manager 120 can strip away advertisements presented on the webpage as well as links to other news articles and other areas of the website in order to obtain just the information that is directly related to the news article included on the webpage.

The run-time content provider 118 can access the formatted news articles and news article previews when a request is received for content associated with the mobile application. The run-time content provider 118 can then provide the some or all of the news articles and/or news article previews to the requesting device.

In some implementations, the run-time content provider 118 uses parameters provided by the publishers 102*a-c* to identify content to provide to mobile devices 130 in response to requests for content. For example, the publisher 102*a* can indicate that a news website related mobile application should include previews for most recently posted news articles. As another example, the publisher 102*a* can indicate that the mobile application should include previews for news articles listed as featured articles on a front page of the news website, with a preview for the top news article from the website being positioned as a top preview. As yet another example, the publisher 102*a* can indicate that previews associated with the most popular news articles are presented by the mobile application. In some implementations, the popularity of news articles is identified using data provided by the publisher 102*a*, or using page view data obtained from other sources (e.g., analytics tracking data, or browser cookies). As another example, the publisher 102*b* can indicate that a mobile application for an events listing website include previews for event listings that are occurring on the current day.

In some implementations, the run-time content provider 118 identifies content items to provide for presentation by a mobile application without using parameters indicated by a publisher, either because the publisher did not provide any parameters, or a template provided by the application system 110 did not allow the publisher to specify parameters for selecting content items for presentation. In such situations, the run-time content provider 118 can use any of the previously described methods for identifying content items for presentation (e.g., most recently posted, featured items, most popular items, events occurring that day) or another methodology for identifying content items to provide to the mobile application for presentation.

In some implementations, the application content manager 120 determines scores for snippets (i.e., sections of articles, event listings, or other postings taken from a website) in order to rank the snippets. In some implementations, the run-time content provider 118 provides snippets having the highest scores to mobile devices 130 for presentation by mobile applications 132. The scores determined by the application content manager 120 can be based on one or more factors, including, for example, location of a posting within a website (e.g., front page, top of page, secondary page, etc.), popularity of a posting, featured designation of a posting, time of the posting, time of an event listed in the posting, or relation of the posting to a selected category.

For example, news postings about occurrences in New York City can be given a higher ranking score for a category of local news selected by a user located in New York City. As another example, news postings relating to basketball can be given a higher ranking score for a basketball category. As another example, a posting time related portion of a ranking score can be higher for a more recently posted posting than a less recently posted posting. As yet another example, a posting that is viewed by a large number of people can be given a higher ranking score than a posting having less views. Additionally, an article having a headline in a large font size can be given a higher ranking score than an article having a headline with a smaller font size.

In some implementations, a publisher specifies parameters for selecting articles in response to a selection of a content category by a user of the mobile application 132. For example, the publisher can provide one or more URLs of webpages to associate with each category presented by the mobile application 132. The application content manager 120 can use the indicated URLs to identify postings to associate with an associated category for the URL. For example, the mobile application 132 can include a category selection icon for a business news category. The publisher can indicate a URL of a business section of a website to associate with the business news category selection icon. When a user selects the business news category selection icon, the run-time content provider 118 can provide content items that have been extracted from the indicated business section of the website by the application content manager 120.

In some implementations, the application content manager 120 uses content analysis methods to identify content items that are related to particular categories. For example, the application content manager 120 can identify a news article containing several instances of the words "basketball," "score," "points," and "rebounds" as belonging to a sports or basketball category. As another example, the application content manager 120 can identify a news article containing the words "Russia," "diplomacy," and "international" as belonging to a world news category.

In some implementations, in addition to dynamic content derived from websites associated with mobile applications 132, the run-time content provider 118 provides one or more advertisements to requesting mobile devices for presentation by the mobile applications 132. For example, advertisements can be presented in designated advertisement presentation areas of a particular mobile application 132. In some implementations, the run-time content provider 118 contacts an advertisement system to identify advertisements that are relevant to content presented by the mobile application 132. Identified advertisements can be ranked based on their relevance to the content as well as other factors (e.g., advertisement auction results) and the highest ranked advertisements can be provided for presentation by the mobile application 132. In some implementations, user interactions with the provided advertisements are tracked. For example, presentation of advertisements to users can be tracked and selection of advertisements by users can be tracked. Advertising conversions (e.g., purchases or other user interactions) associated with provided advertisements can also be tracked. The tracking can be anonymized (e.g., with randomly assigned identifiers) to prevent individually identifying information from being collected and/or stored. The publishers 102a-c can be paid for advertisements that are presented on mobile applications associated with the publishers 102a-c.

In some implementations, the run-time content provider 118 and the application content manager 120 are included in a system that is separate from the application system 110. For example, the application system 110 can handle the actions of providing templates to the publishers 102a-c and creating mobile applications while a separate system handles the actions of providing real-time content to the mobile devices 130 for presentation by the mobile applications 132.

Figure 2:
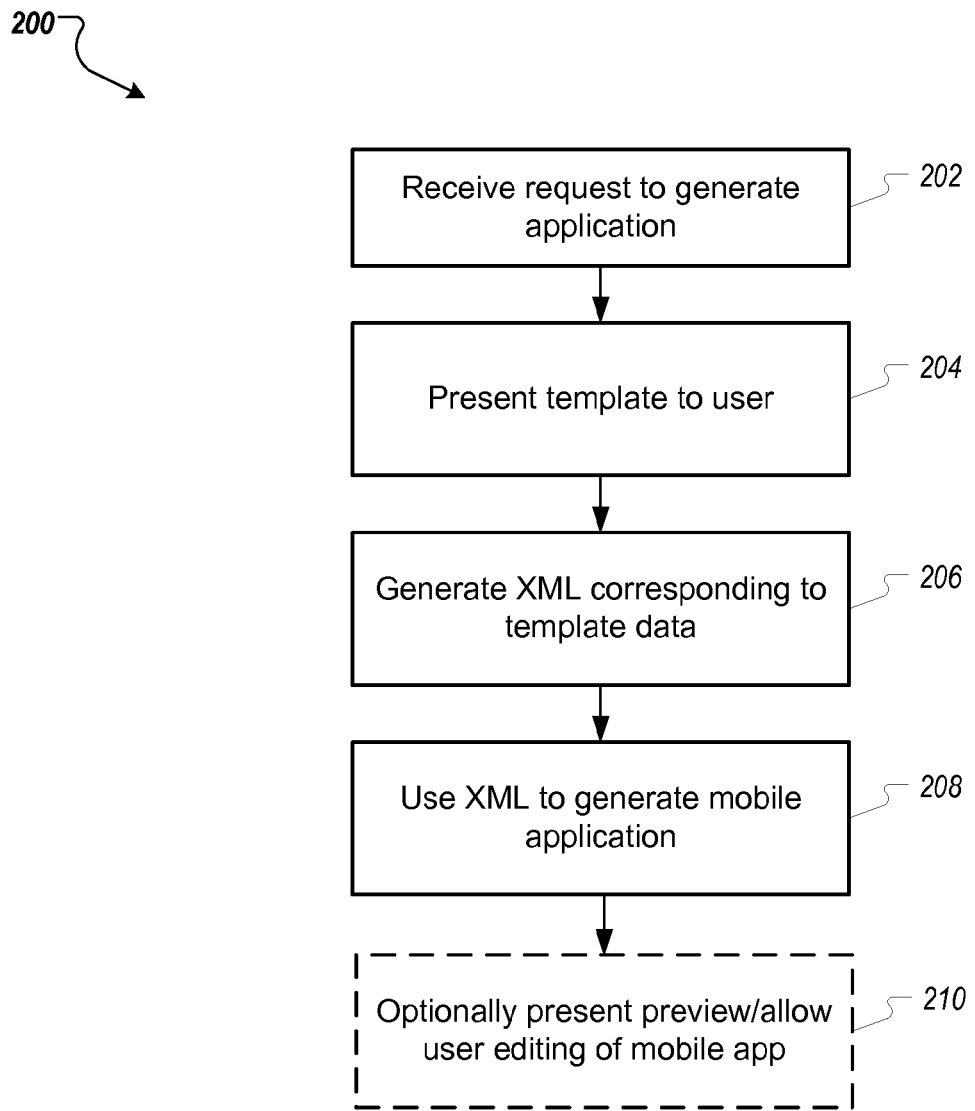
FIG. 2 is a flow chart of an example method for generating a mobile application.

FIG. 2 shows a flow chart of an example process 200 for generating a mobile application. In some implementations, the process 200 can be performed by a system including one or more computing devices, e.g., the application system 110 shown in FIG. 2.

At step 202, a request to generate an application is received. For example, a publisher of a website or other web resource (e.g., the publisher 102a of FIG. 1) can send a request for generation of a mobile application to an application system (e.g., the application system 110 of FIG. 1). In some implementations, the request includes an indication of a website or web resource for which an application is to be generated. For example, the publisher can provide a URL of a website for which an application is to be generated along with the request. In some implementations, the received request includes an indication of a type of website or web resource for which an application is to be generated. For example, the publisher can indicate that an application is to be generated for a news website. As another example, the publisher can indicate that an application is to be generated for an internet radio station.

At step 204, a template is presented to a user. For example, an application system (e.g., the application system 110 of FIG. 1) provides a template to a user associated with a publisher (e.g., the publisher 102a of FIG. 1). In some implementations, the template is identified based on a type of website for which an application is to be generated. For example, the user can indicate that the website is a news website and the application system can provide a template for news websites or a more general template for text based postings websites to the user. As another example, the application system can parse the indicated website, or cached data extracted from the indicated website to identify a website type for the website. The application system can then provide a template associated with the identified website type. In some implementations, multiple templates are presented to the user for user selection.

The user can use the template to enter parameters for the requested application. Information that can be entered into the template by the user can include layout, design, color scheme, logos, images, header text, and categories. For example, the user can upload a logo for the website and enter a title for the website. The logo and title can be used to create a header for the mobile application. As another example, the user can indicate positions for posting summaries (e.g., snippets) within the mobile application. As yet another example, the user can designate one or more areas of the mobile application as advertisement display areas. In some implementations, the user designates categories of content and provide associated URL's corresponding to that content. For example, a news website can have categories such as "sports" or "entertainment" as separate pages or frames in a website. The user can identify the corresponding URL in the template to facilitate retrieval of news articles in that category.

At step 206, code corresponding to the template data is generated (e.g., as XML code). The template data is data entered by the user using the provided template. The XML code can include all of the layout information that is specific to the application that is to be generated. In some implementations, the XML code is stored in a database of XML code that includes XML layouts for multiple applications. In some implementations, the layout for an application is stored in a format other than XML (e.g., JSON or HDF).

At step 208, a mobile application is generated using the code. For example, executable code (e.g., Objective-C code or Java code) is created for a particular type of mobile device using the XML code for the specific layout indicated by the user using the template. In some implementations, the user specifies one or more types of devices or mobile platforms for which an application is to be generated. For example, the user can specify several different cell phone and personal digital assistant (PDA) models for which an application is to be generated. An application can be generated for each indicated device type using the XML code.

At optional step 210, a preview is presented to the user and the user is allowed to edit the mobile application. For example, an application system presents a preview of one or more display pages of the requested mobile application to a user associated with a publisher. A user interface can be provided to the user to allow the user to adjust portions of the layout of the mobile application, or enter new or different parameters for the mobile application.

In some implementations, the user repositions elements of the mobile application. In other implementations, the user modifies content of the mobile application. For example, the user can indicate a different logo to include in the header for the mobile application. As another example, the user can indicate a different number of snippets to include for each page of the mobile application.

In some implementations of the process 200, more or fewer steps are performed or one or more steps can be performed in a different order. For example, the process 200 can additionally include a step of presenting a user interface to a user prior to the step of receiving a request to generate an application. As another example, the process 200 can include a step of generating a mobile application directly from the template data rather than performing the steps of generating XML code from the template data and generating a mobile application from the XML code.

Figure 3:
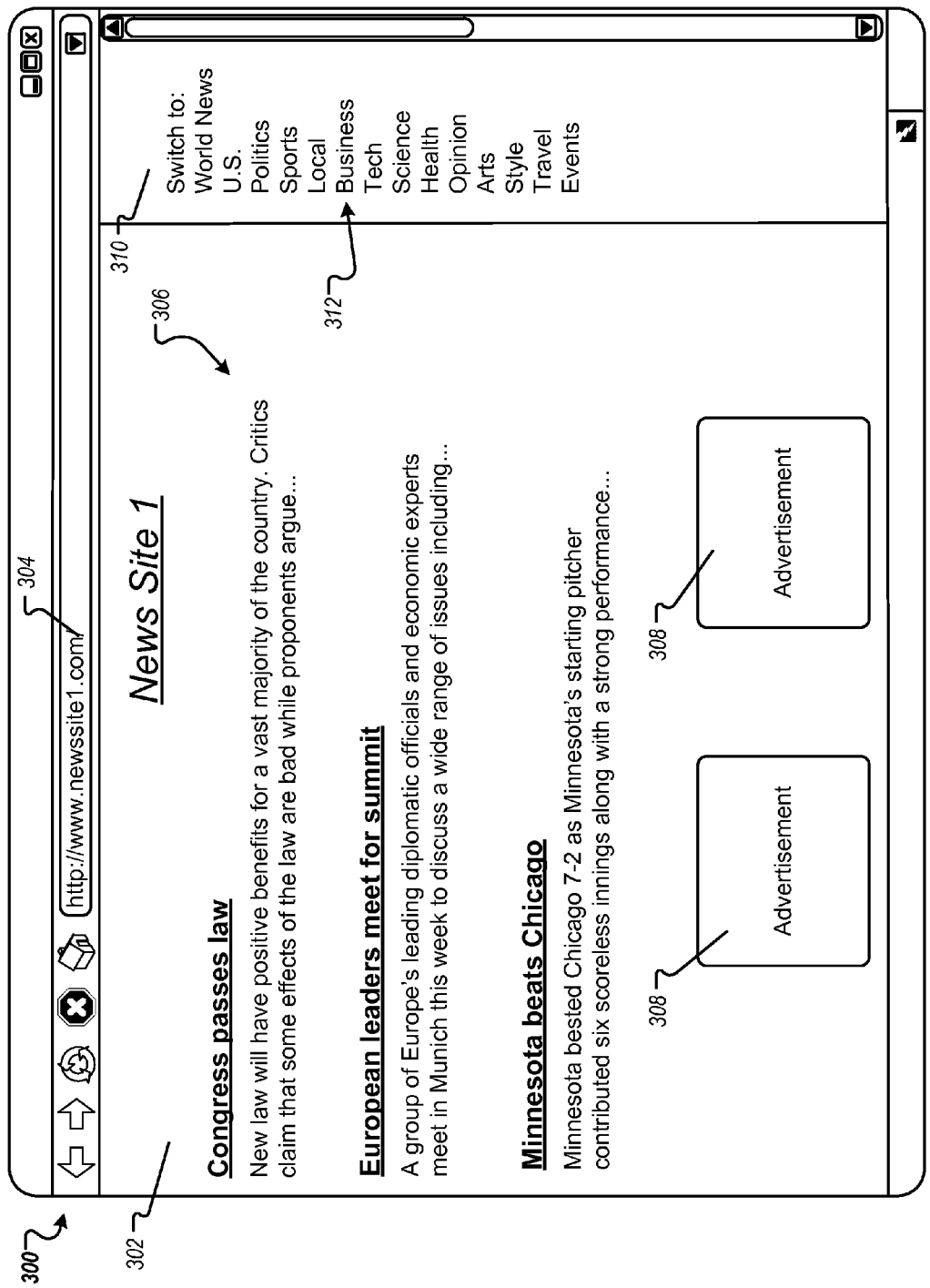
FIG. 3 is an example view of a website.

FIG. 3 shows an example of a website 302. The website 302 can be configured to be displayed, for example, within a web browser 300. The website 302 is a news website having a title "News Site 1" and a URL 304 "www.newssite1.com." The website 302 can include multiple webpages with one or more content items associated with each webpage. The example shows a front page of the website 302. The front page includes headlines and snippets for several news articles 306 that are included on webpages of the website 302. A user viewing the website 302 can select one of the headlines and/or snippets to be redirected to a webpage containing a full version of the news article 306 associated with the selected headline or snippet.

The website 302 additionally includes advertisements 308. The advertisements can be provided by an advertisement server system for presentation on the website 302 along with the other content items of the website 302. The website 302 additionally includes a navigation menu 310 with a listing of categories 312. The user can select from the listing of categories 312 to be directed to a webpage containing articles or article snippets for news articles related to the selected category. For example, the user can select a category 312 labeled "Business" to be directed to a webpage containing a listing of business related news articles. As another example, the user can select an events category 112 to be directed to a webpage containing upcoming even listings.

A publisher of the website 302 can submit a request to an application system (e.g., the application system 110 of FIG. 1) for a mobile application to be generated for the website 302. The application system can use the information provided by the publisher to generate a mobile application for the website 302 as described above.

Figure 4:
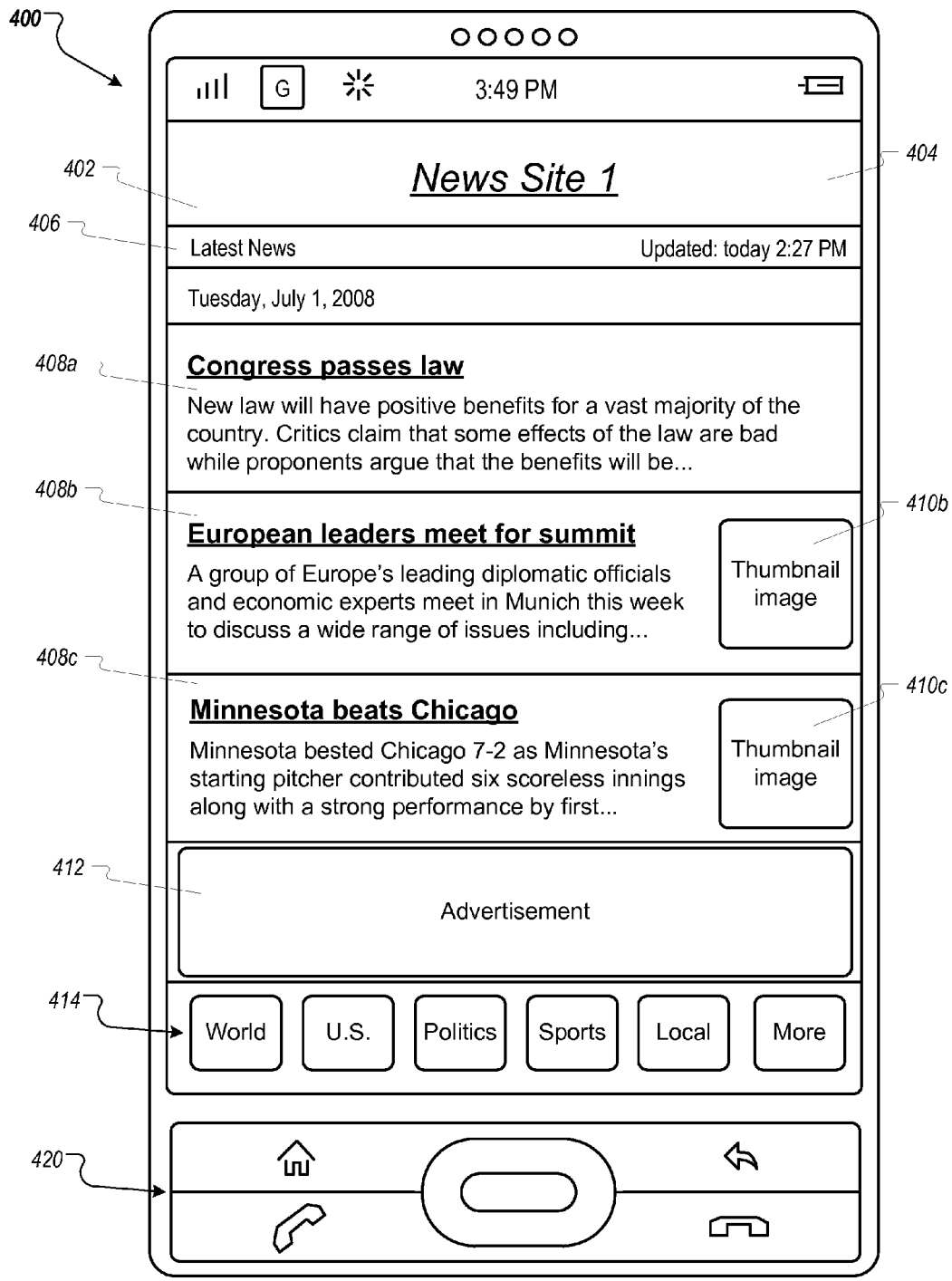
FIG. 4 is an example mobile application view for the website of FIG. 3.

FIG. 4 is an example mobile application 402 for the website 302 of FIG. 3. The mobile application 402 can be configured to be displayed, for example, on a mobile device 400. The mobile application 402 can be loaded onto the smart phone 400, for example, by being requested/purchased using a mobile application store or by being downloaded from a website or other mobile application distribution service. A user can cause the mobile device 400 to execute the mobile application 402 by selecting an icon associated with the mobile application 402. The icon for the mobile application 402 can be created, for example, using a logo uploaded by a publisher that requested the creation of the mobile application 402 using a template provided by an application system. The icon for the mobile application 402 can be displayed along with icons for other mobile applications stored on the mobile device 400.

The mobile application 402 includes a title bar 404 displaying a title of "News Site 1" for the mobile application 402. In some implementations, the title is identified from information provided by a publisher using a template. In some implementations, an application system identifies the title using data extracted from an associated website. For example, the application system can identify the title of the website 302 of FIG. 3 as "News Site 1" and use this title as the title for the mobile application 402. In some implementations, the title bar 404 additionally includes one or more logos or images provided by the publisher or a design feature specified by the publisher.

The mobile application 402 includes an information bar 406. The information bar indicates that the currently displayed news snippets are associated with a latest news category and that the news snippets were most recently updated on the current day at 2:27 PM. In some implementations, the information bar 406 conveys other information about the mobile application 402. For example, the information bar 406 can include a scrolling text field listing headlines for breaking news stories. As another example, the information bar 406 can indicate that a newer version of the mobile application 402 is available for download or purchase.

The mobile application 402 includes news article previews 408a-c. The news article previews 408a-c can include headlines for recent news articles and snippets derived from the news articles. Each of the snippets can be the first few lines of a news article, a summary of a news article, or another portion of a news article. Additionally, the news article previews 408b and 408c include thumbnail images 410b and 410c respectively. The content of the news article previews 408a-c (e.g., the headlines, snippets, and thumbnails) can be provided to the mobile device 400 by a run-time content provider. The content can be derived from the associated website (e.g., the website 302 of FIG. 3) and formatted for display by the mobile application 402. The run-time content provider can send content to the mobile application for display based on, for example, the category selected by the user when interacting with the mobile application 402. In some implementation, the mobile application does not process the received content. Instead, the mobile application 402 simply displays content provided by the run-time content provider (e.g., based on a request from the mobile application 402 initiated by the user executing the mobile application or interacting with the mobile application).

The run-time content provider can determine which news articles to provide news article preview information by ranking news articles contained on the associated website using criteria as described above. For example, the run-time content provider can identify news articles posted on the front page of the website 302 of FIG. 3 and provide news article preview information for the identified news articles. As another example, the run-time content provider can identify news articles associated with a user selected category and provide news article preview information for some or all of the identified news articles.

The layout of the news article previews 408a-c can be identified by a publisher of the associated website using a provided template. For example, the publisher can indicate the relative positions of the headlines, snippets, and thumbnails within each news article preview 408a-c. As another example, the publisher can indicate that the snippet for each news article preview 408a-c is to include three lines of text from a related full news article. As yet another example, the publisher can indicate a height and width for each news article preview 408a-c as well as a total number of news article previews to include in a single display page of the mobile application 402.

In some implementations, a user of the mobile device 400 selects one of the news article previews 408a-c (e.g., using touch screen functionality of the mobile device 400, or by using control buttons 420) to cause a full version of an associated news article to be displayed by the mobile application 402. For example, the user can select the news article preview 408c to cause a full news article having the headline "Minnesota beats Chicago" to be displayed.

The mobile application 402 further includes an advertisement 412. In some implementations, the advertisement 412 is provided by the run-time content manager. For example, the run-time content manager can contact an advertisement system to request one or more advertisements for presentation by the mobile application 402. The run-time content manager can then provide an advertisement received from the advertisement system to the mobile device 400 for presentation by the mobile application 402. In some implementations, the advertisement 412 is targeted to relate to other content items displayed by the mobile application 402.

For example, the run-time content provider can indicate the content of the news article previews 408*a-c* to the advertisement system. The advertisement system can use this information to identify one or more advertisements that are related to the content of the news article previews 408*a-c* or the full news articles associated with the news article previews 408*a-c*. In some implementations, the mobile application 402 makes a direct request for advertising content to the advertisement system and receive the advertising content directly from the advertising system rather than from the run-time content manager.

In some implementations, the publisher of the associated website for the mobile application 402 indicates the position of the advertisement 412 within the display of the mobile application 402. For example, the publisher can indicate that the advertisement 412 should be positioned directly below the title bar 404. The publisher can additionally indicate a number (e.g., two) of advertisements to display as part of the mobile application 402. In some implementations, the publisher is financially compensated for advertisements that are displayed by the mobile application 402. For example, the advertising system can pay the publisher each time an advertisement is displayed by the mobile application 402.

The mobile application 402 includes category selection icons 414. In the example depicted, the mobile application 402 includes category selection icons 414 for categories of "world," "U.S.," "Politics," "Sports," and "Local" news (e.g., as permanent icons of the mobile application). The mobile application 402 further includes a category selection icon 414 labeled "more." Selecting the "more" category selection icon 414 can cause the mobile application 402 to display additional categories. For example, the mobile application 402 can display a category selection screen listing all possible categories for the mobile application 402.

The user of the mobile device 400 can select one of the category selection icons 414 to cause the mobile application 402 to display news article previews for news articles associated with the selected category. For example, selecting the "Politics" category selection icon 414 causes the mobile application 402 to display news article previews for politics related news articles. In some implementations, selecting one of the category selection icons 414 causes the mobile application 402 to send a request for content to the run-time content provider. The run-time content provider can identify content items associated with the selected category and provide news article preview information for each of the identified content items. The mobile application 402 can then display news article previews for the identified content items.

In some implementations, the categories are defined by the publisher using a provided template. A user associated with the publisher can enter one or more categories into the template. The user can additionally specify which categories are to appear on a main screen of the advertisement 412 and which categories are to appear on a category list display screen (e.g., a screen that appears in response to selection of the "more" category selection icon 414). In some implementations, the publisher indicates where the category selection icons 414 are to be positioned on the display of the mobile application 402. For example, the publisher can indicate that the category selection icons 414 are to be displayed in a horizontal row along the bottom. As another example, the publisher can indicate that the icons are to appear along the left side of the mobile application 402 display.

In some implementations, the publisher specifies a design for each of the category selection icons 414. For example, the publisher can upload an icon to be used for each of the category selection icons 414. As another example, the publisher can indicate a design to be used for all of the category selection icons 414. In some implementations, the publisher indicates URLs of webpages of the associated website to associate with each of the category selection icons 414. For example, the publisher can indicate a URL of a sports page of the associated website to associated with the "Sports" category selection icon 414. The provided URL can indicate to an application content manager where news articles associated with the indicated category are located within the associated website. The application content manager can then identify news articles and other postings from the indicated page as being associated with the indicated category as described above.

In some implementations, an application system identifies the categories to be associated with the category selection icons 414. The application system can identify the top listed categories as the most important categories and include category selection icons 414 for the top listed categories on the main page of the mobile application 402. In the example shown, the categories of World, U.S., Politics, Sports, and Local are identified as top categories and associated with category selection icons 414 displayed on the main page of the mobile application 402. The application system can identify the remaining categories as secondary categories. The secondary categories can be displayed as part of a category selection screen of the mobile application 402. The user of the mobile device 400 can access the category selection screen, for example, by selecting the "more" category selection icon 414.

In some implementations, the layout, design, and other features of the mobile application 402 are specified by the publisher of the associated website as described above. For example, the publisher can specify a border color and a background image for the mobile application 402. As another example, the publisher can select the number of news article previews to display on the main page of the mobile application 402. As yet another example, the publisher can indicate one or more fonts to be used for text displayed by the mobile application 402.

Figure 5:
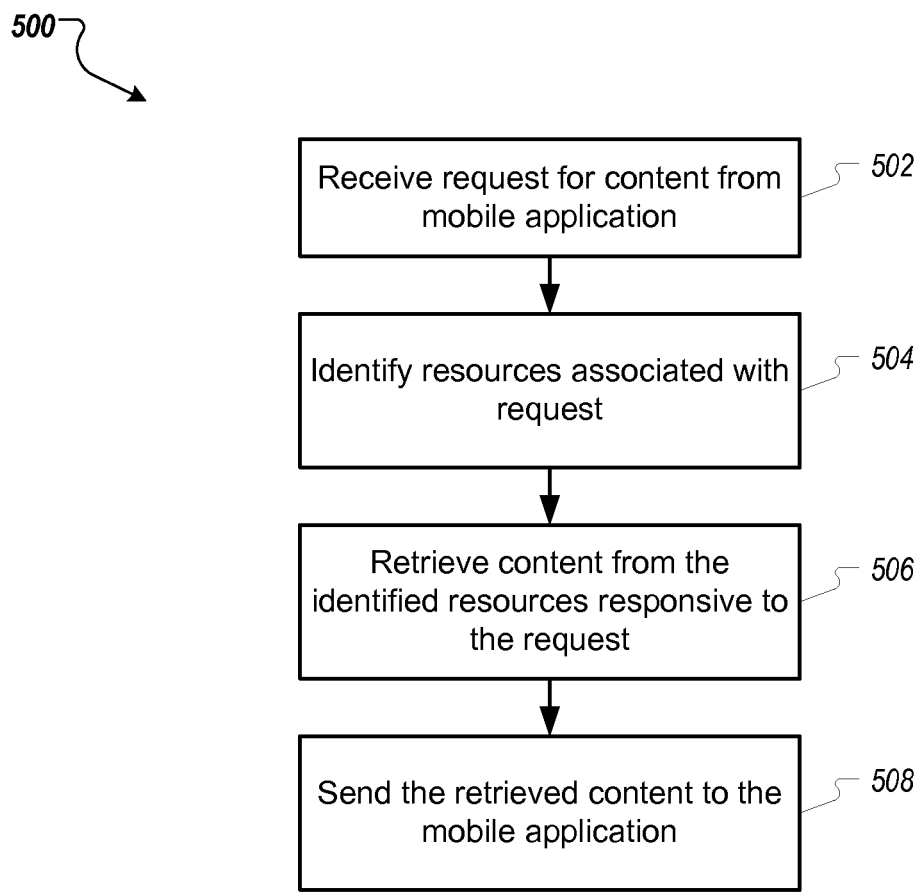
FIG. 5 is a flow chart of an example method for providing content to a mobile application.

FIG. 5 shows a flow chart of an example process 500 for providing content to a mobile application. In some implementations, the process 500 can be performed by a system including one or more computing devices, e.g., the application system 110 shown in FIG. 1. In some implementations, the process 500 is performed by a system that includes a run-time content provider and an application content manager but is separate from an application generator system.

At step 502, a request for content from a mobile application is received. For example, a mobile application (e.g., the mobile application 132 of FIG. 1) running on a mobile device (e.g., the mobile device 130 of FIG. 1) sends a request for content to an application system that includes a run-time content provider (e.g., the run-time content provider 118 of FIG. 1). The request can include an identifier for the mobile application or for a website associated with the mobile application.

In some implementations, the request includes an indication of a particular type of content associated with the mobile application. For example a request received from a news mobile application can indicate that news items associated with a sports category are requested. As another example, a request received from an events listing mobile application can indicate that events for a particular date are requested. As yet another example, a request received from a food delivery mobile application can indicate that information for Indian restaurants located near the user of the mobile application is requested. In some implementations, the request includes one or more resource identifiers associated with the requested content (e.g., a URL for a web page including the requested content).

At step 504, resources associated with the request are identified. For example, an application system (e.g., the application system 110 of FIG. 1) can identify a website associated with the mobile application (e.g., a website for which the mobile application was generated). As another example, if the request includes an indication of a content category, the application system can identify one or more webpages of an associated website that relate to the indicated content category. For example, the request can indicate an opinion category and the application system can identify one or more opinion webpages of the associated website.

In some implementations, the publisher of the associated website provides URLs for pages to be associated with some or all of the categories. These URLs can be provided with the corresponding request from the mobile application or mapped from the mobile application request to stored information about the mobile application at the application system. In some implementations, the application system identifies pages to associate with categories using content analysis of the pages as described above.

In some implementations, identifying resources associated with the request includes identifying stores of data extracted from an associated website. For example, an application content manager can periodically crawl the associated website to collect data. In some implementations, the application content manager associates retrieved content items with one or more categories. The application system can identify the stored website data associated with the website, or stored website data associated with a particular content category specified by the request.

At step 506, content from the identified resources is retrieved (or a portion is retrieved) responsive to the request. For example, the application system can retrieve news articles from a sports page of the associated website responsive to a received request for sports related content items. As another example, application system can access stored website data collected by the application content manager to identify content items that match the received request. In some implementations, content items are ranked according to criteria. The criteria can include location of a content item on within a website (e.g., front page, top of page, secondary page, etc.), popularity of a content item, featured designation of a content item, time of the content item, time of an event listed in the content item, or relation of the content item to a selected category. The application system can identify and retrieve the highest ranked content items.

At step 508, the retrieved content or portion thereof is sent to the mobile application. For example, the application system provides the retrieved content items to a mobile device running the mobile application through a network (e.g., the Internet, a LAN., or WAN). The mobile application can then present the content to one or more users. In some implementations, advertising content is provided to the mobile application along with the retrieved content. For example, the application system can contact an advertising server to request advertising content. The application system can indicate contextual information associated with the retrieved content items to allow the advertising server to identify advertising content related to the retrieved content items. The advertising server can provide one or more advertisements to the application system which can in turn provide the advertisements to the mobile application for presentation to one or more users.

In some implementations of the process 500, more or fewer steps can be performed or one or more steps can be performed in a different order. For example, the process 500 can include a step of formatting the retrieved content before the step of sending the retrieved content to the mobile application. Formatting the content can include extracting snippets from content items, creating content item previews, and creating thumbnail images from retrieved images.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a request to generate a mobile application specifically associated with a collection of web resources from a particular designated website, wherein the mobile application, when downloaded and executed on a user device, is configured to provide content from the designated website to a user of the mobile device and;
presenting a mobile application template to a user, the template being configured to receive user input specifying features of the mobile application to be generated and identifying corresponding resources of the collection of web resources having content to be included in the mobile application, and wherein the presented template has a structure based on the type of website; and
processing, using one or more processors, the received template data to automatically generate executable code for the mobile application for the collection of web resources and including the user specified features.

2. The method of claim 1, further comprising:
presenting a preview of the generated mobile application to the user.

3. The method of claim 2, further comprising:
receiving one or more editing inputs from the user; and
modifying the generated mobile application according to the received one or more editing inputs.

4. The method of claim 1, where processing the received template data includes generating XML data from the template.

5. The method of claim 4, where automatically generating the mobile application includes applying the XML data to a code skeleton for a mobile application of a particular type.

6. The method of claim 1, where automatically generating the mobile application includes retrieving content from the identified resources.

7. The method of claim 1, where presenting the template includes determining a category for the mobile application and selecting a template from a plurality of templates based on the determined category.

8. The method of claim 1, further comprising:
receiving user input specifying features of the mobile application including identifying content categories for presentation in the mobile application.

9. The method of claim 1, further comprising:
receiving user input specifying features of the mobile application including specifying layout features for the mobile application to be generated.

10. The method of claim 1, further comprising:
receiving user input specifying one or more of a device, service provider, or operating system platform for the mobile application to be generated.

11. A method comprising:
receiving a request for website content from a mobile application executing on a mobile device, wherein the mobile application is configured to provide web content from a particular designated website, the request including an identification of a resource location associated with the website content, wherein the resource location corresponds to a resource location of a web resource of the website;
identifying, using one or more processors, the website content associated with the resource location;
retrieving the requested website content;
formatting the retrieved website content for presentation on the mobile application,
wherein formatting includes one or more of extracting snippets from content items, creating content item previews, and creating thumbnail images from retrieved images; and
sending the formatted requested content to the mobile application.

12. The method of claim 11, where retrieving the requested content includes identifying cached content previously retrieved from the identified resource location.

13. The method of claim 11, where retrieving the requested content includes retrieving the requested content from the identified resource location.

14. A system comprising:
one or more processors configured to interact with a computer readable storage medium in order to perform operations including:
receiving a request to generate a mobile application specifically associated with a collection of web resources from a particular designated website, wherein the mobile application,
when downloaded and executed on a user device, is configured to provide content from the designated website to a user of the mobile device and;
presenting a mobile application template to a user, the template being configured to receive user input specifying features of the mobile application to be generated and identifying corresponding resources of the collection of web resources having content to be included in the mobile application, and wherein the presented template has a structure based on the type of website; and
processing, using one or more processors, the received template data to automatically generate executable code for the mobile application for the collection of web resources and including the user specified features.

15. The system of claim 14, further configured to perform operations comprising:
presenting a preview of the generated mobile application to the user.

16. The system of claim 15, further configured to perform operations comprising:
receiving one or more editing inputs from the user; and
modifying the generated mobile application according to the received one or more editing inputs.

17. The system of claim 14, where processing the received template data includes generating XML data from the template.

18. The system of claim 17, where automatically generating the mobile application includes applying the XML data to a code skeleton for a mobile application of a particular type.

19. The system of claim 14, where automatically generating the mobile application includes retrieving content from the identified resources.

20. The system of claim 14, where presenting the template includes determining a category for the mobile application and selecting a template from a plurality of templates based on the determined category.

21. The system of claim 14, further configured to perform operations comprising:
receiving user input specifying features of the mobile application including identifying content categories for presentation in the mobile application.

22. The system of claim 14, further configured to perform operations comprising:
receiving user input specifying features of the mobile application including specifying layout features for the mobile application to be generated.

23. The system of claim 14, further configured to perform operations comprising:
receiving user input specifying one or more of a device, service provider, or operating system platform for the mobile application to be generated.

24. A system comprising:
one or more processors configured to interact with a computer readable storage medium in order to perform operations including:
receiving a request for website content from a mobile application executing on a mobile device, wherein the mobile application is configured to provide web content from a particular designated website, the request including an identification of a resource location associated with the website content,
wherein the resource location corresponds to a resource location of a web resource of the website;
identifying, using one or more processors, the website content associated with the resource location;
retrieving the requested website content;
formatting the retrieved website content for presentation on the mobile application wherein formatting includes one or more of extracting snippets from content items, creating content item previews, and creating thumbnail images from retrieved images; and
sending the requested content to the mobile application.

25. The system of claim 24, where retrieving the requested content includes identifying cached content previously retrieved from the identified resource location.

26. The system of claim 24, where retrieving the requested content includes retrieving the requested content from the identified resource location.

27. A non-transitory computer storage medium encoded with a computer program, the program comprising instructions that when executed by data processing apparatus cause the data processing apparatus to perform operations comprising:
receiving a request to generate a mobile application specifically associated with a collection of web resources from a particular designated website, wherein the mobile application when downloaded and executed on a user device, is configured to provide content from the designated website to a user of the mobile device and;

presenting a mobile application template to a user, the template being configured to receive user input specifying features of the mobile application to be generated and identifying corresponding resources of the collection of web resources having content to be included in the mobile application, and wherein the presented template has a structure based on the type of website; and processing, using one or more processors, the received template data to automatically generate executable code for the mobile application for the collection of web resources and including the user specified features.

28. A non-transitory computer storage medium encoded with a computer program, the program comprising instructions that when executed by data processing apparatus cause the data processing apparatus to perform operations comprising:

receiving a request for website content from a mobile application executing on a mobile device, wherein the mobile application is configured to provide web content from a particular designated website, the request including an identification of a resource location associated with the website content, wherein the resource location corresponds to a resource location of a web resource of the website;

identifying, using one or more processors, the website content associated with the resource location;

retrieving the requested website content;

formatting the retrieved website content for presentation on the mobile application, wherein formatting includes one or more of extracting snippets from content items, creating content item previews, and creating thumbnail images from retrieved images; and sending the requested content to the mobile application.

* * * * *